R. L. PAGE.
HIGH PRESSURE STEAM COOKING VESSEL.
APPLICATION FILED FEB. 26, 1910.
1,010,792. Patented Dec. 5, 1911.
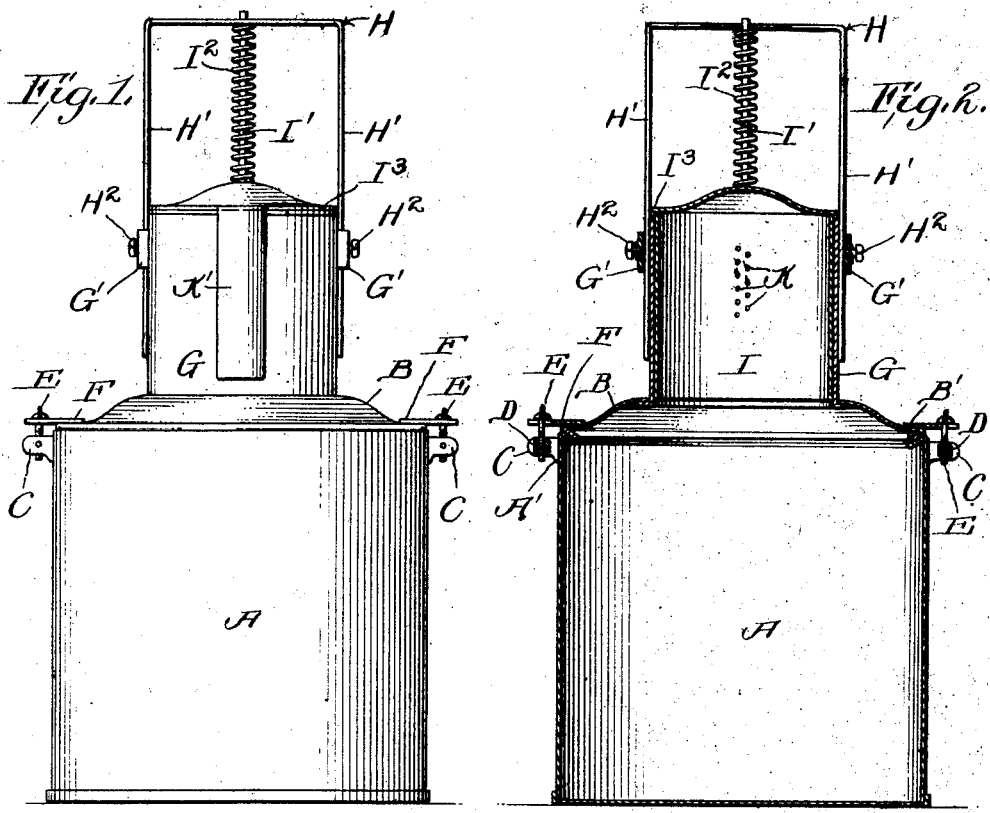
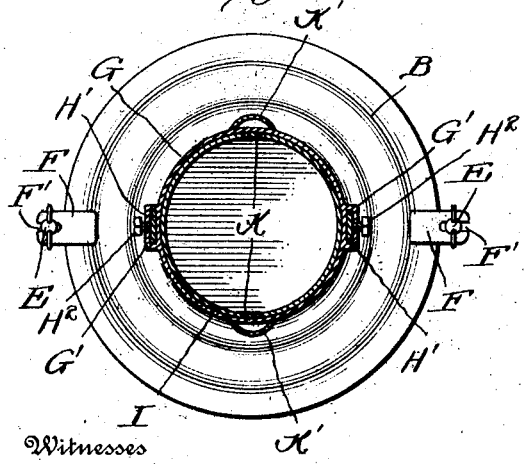
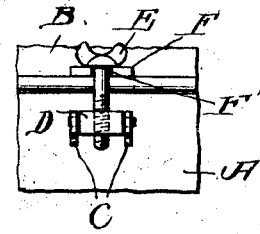
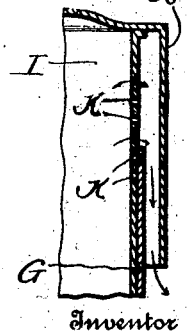
Witnesses
Inventor
R. L. Page

UNITED STATES PATENT OFFICE.

RUFUS L. PAGE, OF PUXICO, MISSOURI.

HIGH-PRESSURE STEAM COOKING VESSEL.

1,010,792.
Specification of Letters Patent.
Patented Dec. 5, 1911.

Application filed February 26, 1910. Serial No. 546,175.

*To all whom it may concern:*

Be it known that I, RUFUS L. PAGE, a citizen of the United States, residing at Puxico, in the county of Stoddard and State of Missouri, have invented a new and useful Improvement in High-Pressure Steam Cooking Vessels, of which the following is a specification.

This invention relates to certain new and useful improvements in cooking vessels, the object being to provide a cooking vessel which is so constructed that vegetables of all kinds can be readily cooked in high altitudes, thereby overcoming the disadvantages of cooking vessels now in use, and at the same time I have provided a vessel in which the time required for cooking in all altitudes is much shorter than with the time required with ordinary vessels.

Another object of my invention is to provide a cooking vessel with an automatic valve whereby the steam will be allowed to escape after a certain amount of pressure has been obtained within the vessel, so as to prevent the vessel from exploding.

A still further object of my invention is to provide means for adjusting the valve in order to allow the steam to escape therefrom at any desired pressure which enables the vessel to be used in laboratories to demonstrate the effect that pressure has upon the boiling point of water or other fluid.

Another object of my invention is to provide a cooking vessel which is exceedingly simple and cheap in construction, and one which is very strong and durable and in which the parts are so mounted in respect to each other that all danger of the parts getting out of order is prevented.

With these objects in view, the invention consists in the novel features of construction, combination and arrangement of parts, hereinafter fully described and pointed out in the claim.

In the drawing forming a part of this specification: Figure 1 is a side elevation of my improved cooking vessel. Fig. 2 is a vertical section through the same. Fig. 3 is a horizontal section, and Fig. 4 is a detail view showing the manner of connecting the cover to the vessel. Fig. 5 is a detail vertical section.

In carrying out my improved invention I employ a vessel A, which may be formed of any suitable material and is provided with an annular inwardly projecting depending flange A', at its upper edge on which is adapted to be seated the annular inwardly projecting depending flange B', of a cover B, the flanges being so formed that an exceedingly tight joint is formed between the same. Extending outwardly from the opposite sides of the vessel A are spaced apertured lugs C, in which are pivotally mounted blocks D which are provided with transverse threaded bores D', in which are mounted thumb-screws E adapted to fit in the slotted ends F', of the respective plates F which are secured on top of the cover at opposite points, so that after the screws have been forced in the slots by tightening up on the same, the cover can be drawn tightly down on the vessel, so as to form a perfect steam tight joint between the flanges. By this construction when the screws are loosened they can be swung outwardly so as to throw the same out of engagement with the plates in order to allow the cover to be readily raised.

The cover B is provided with a central opening having an upwardly projecting cylindrical portion G surrounding the same provided with guide-ways G' in which are adjustably mounted the depending arms H', of the substantially inverted U-shaped frame H which are locked in their adjusted positions within the respective guide-ways by set-screws $H^2$ carried by the guideways whereby the frame can be adjusted up and down for the purpose hereinafter fully described.

Mounted within the upwardly projecting cylindrical portion of the cover is a cylindrical valve I which is provided with a central upwardly projecting rod I' extending through a central opening formed in the cross bar of the U-shaped frame and said rod is surrounded by a coiled spring $I^2$ for normally holding the valve down within the cylindrical portion of the cover. The cylindrical valve is provided with an annular flange $I^3$ at its upper edge for limiting the downward movement of the same within the casing, and it will be seen that by adjusting the frame in respect to the cylindrical portion of the cover, tension of the spring bearing on the valve can be adjusted, so as to regulate the valve in order that the same will open at any desired pressure obtained within the vessel. The valve I is provided with a series of openings K which may be marked or graduated in any way, so as to indicate the pressure within the vessel, and these openings form outlets for the steam when the same is raised above the cylindrical portion of the cover by the pressure of the steam, so that the steam can readily escape in order to prevent the vessel from exploding. By adjusting the frame, so as to increase the compression of the spring, the valve will be held within the cylindrical portion of the cover until a greater pressure is obtained within the vessel, and by raising the same the valve will be allowed to move upwardly when the steam pressure within the vessel becomes greater than the pressure of the spring. For preventing the steam escaping out of the openings of the valve from burning the hands of the user of the vessel, I provide the flange of the valve with a trough-shaped casing K which extends down over the openings, and is spaced therefrom to accommodate the cylindrical portion of the cover, and it will be seen by this construction the steam will be carried downwardly.

What I claim is:

A device of the kind described comprising a cooking vessel, a detachable top adapted to be firmly secured thereto, a central cylindrical, upward extension carried by said cover, a cylindrical valve closed at the top and opening downwardly and snugly fitting said extension, said valve having side openings arranged in vertical alinement, downwardly extending casings carried by the valve and covering said openings, said casings opening downwardly, an adjustable frame carried by the said extension, and a spring bearing respectively upon said frame and upon said valve.

RUFUS L. PAGE.

Witnesses:
J. W. ALLEN,
JOHN M. PAGE.